UNITED STATES PATENT OFFICE 1,995,334

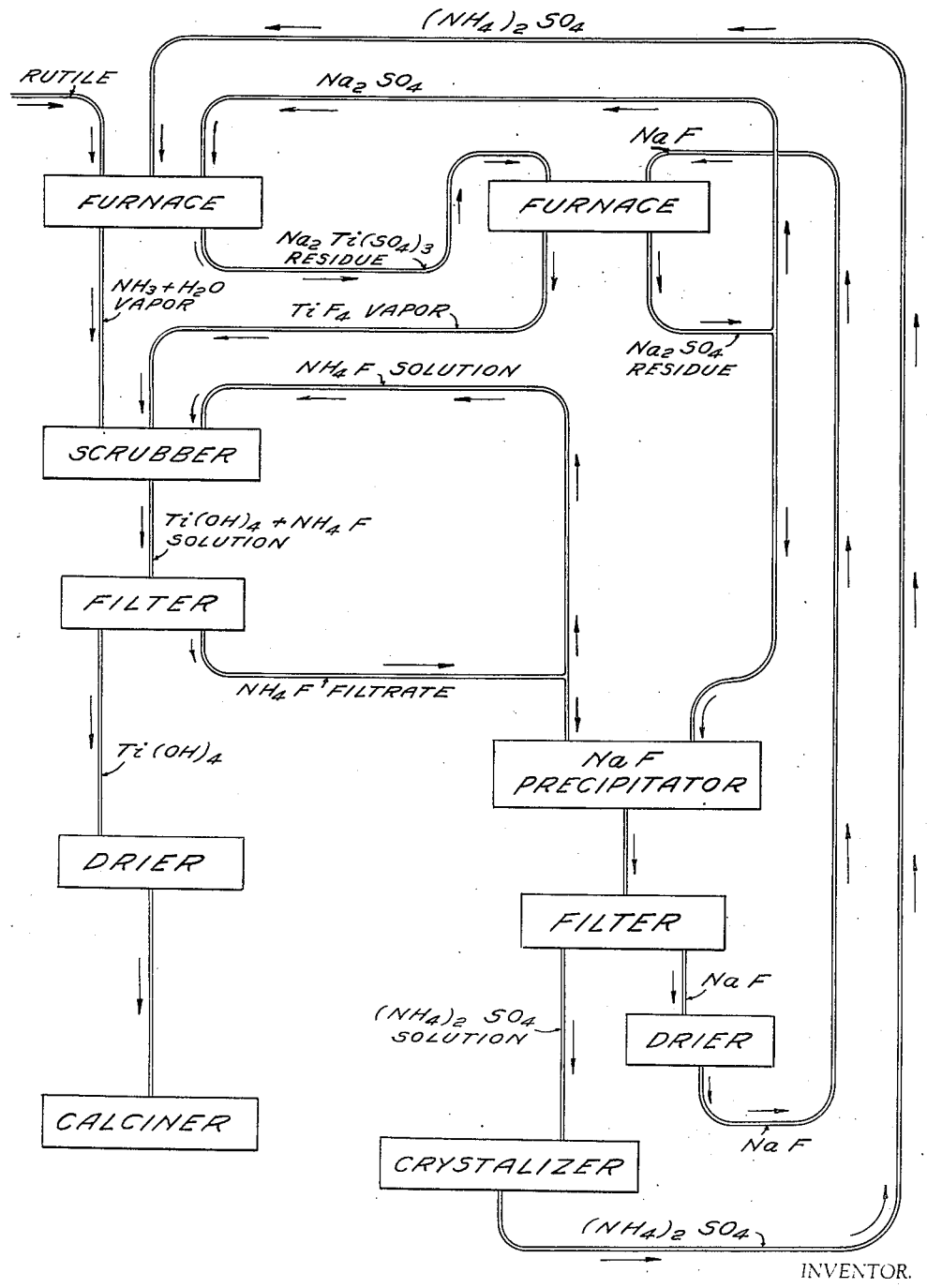

METHOD OF DECOMPOSING AND FURTHER TREATING MATERIAL CONTAINING TITANIUM OXIDE

Svend S. Svendsen, Madison, Wis., assignor to C. F. Burgess Laboratories, Inc., Madison, Wis., a corporation of Delaware Application June 4, 1932, Serial No. 615,471
In Norway June 9, 1931

22 Claims. (Cl. 23—202)

This method is based on the treatment of a material containing titanium oxide, for instance rutile, ilmenite, etc., in such a way that vaporization of the titanium as a titanium tetrafluoride compound takes place. The invention is illustrated by the accompanying drawing, in which the figure presents a flow-sheet of a specific embodiment of my process.

When titanium oxide compounds are heated with hydrofluoric acid or ammonium fluoride a titanium-fluorine compound is formed, which by further heating evolves titanium tetrafluoride or titanium diamminotetrafluoride according to whether hydrofluoric acid or ammonium fluoride is used in the treatment. However, a residue remains, which contains a titanium oxyfluoride compound. The reaction may vary according to the temperature used during the treatment but will be illustrated by the following schematic equation (1) $TiO_2 + 2NH_4F = TiOF_2 \cdot NH_3 + NH_3 + H_2O$.
(2) $TiOF_2 \cdot NH_3 = TiF_4 \cdot 2NH_3 + Ti_2O_3F_2 \cdot NH_3$.

The evaporization of titanium diamminotetrafluoride takes place at a temperature below 400°C., probably at a temperature between 300° C. and 350° C. A further amount of titanium tetrafluoride compound is vaporized at about 400° C. (Equation 2). By heating to about 500° C. or higher sesqui-oxide compounds are formed, probably from the reduction of the tetravalent compound by ammonia.

The titanium diamminotetrafluoride vapors condense to sparkling white crystals. Dissimilar to the analogous silica compound, they are soluble in water without depositing the hydrate. By addition of ammonia a hydrate precipitate is formed.

A similar formation of oxyfluoride and tetrafluoride compounds of titanium takes place by treatment of an oxygen salt of titanium with a fluorine compound in the presence of an oxygen compound capable of supplying oxygen for the formation of oxyfluoride compounds, for instance when the formation of liquid water takes place during the reaction, or water vapors during the vaporization.

But in the absence of oxyfluoride forming oxygen compounds the titanium may be substantially completely vaporized as a tetrafluoride compound. The present invention is based on this condition, comprising decomposing the titanium oxide containing material and removing the titanium therefrom by vaporization as a titanium tetrafluoride compound.

If, for instance, a sodium-titanium sulfate is heated together with a metallic fluoride a double decomposition takes place with the formation of metallic sulfate and titanium fluoride. The reaction may be expressed by the following equation:

(3) $Na_2Ti(SO_4)_3 + 4NaF = TiF_4 + 3Na_2SO_4$.

The normal titanium sulfate is unstable, if existing, and for this reason the stable double sulfate with an alkali metal or ammonia is used. They are easy to produce in a dry way and are for this reason well suited for use in this method. Alkaline earth metals will also form double sulfate with titanium sulfate and may be produced in a dry way.

When using the ammonium double sulfate a sufficient amount of a metallic fluoride should be present to prevent the formation of ammonium bisulfate, which, when formed may lead to the formation of oxyfluoride compounds:

(4) $(NH_4)_2Ti(SO_4)_3 + 6NaF =$
$TiF_4 + 2NH_4F + 3Na_2SO_4$.

Metallic fluorides are preferably used in the operation, as hydrofluoric acid and ammonium fluoride will cause the formation of sulfuric acid or ammonium bisulfate.

The production of double sulfates of tetravalent titanium by fusion with alkali bisulfate or pyrosulfate is well known. A simpler way of producing the double sulfates is to heat the titanium oxide compound with a mixture of alkali sulfate and ammonium sulfate. The normal sulfates as well as the bisulfates may be used. The reaction take place at a temperature above about 280° C. To prevent reduction by ammonia, the temperature is kept below about 350° C. and in general between 300 and 350° C. The temperature may be increased to about 400° C. towards the end of the operation. The alkali sulfate and ammonium sulfate are added in about stoichiometrical proportions The production of the sodium double sulfate may be expressed by the following equation:

(5) $TiO_2 + Na_2SO_4 + 2(NH_4)_2SO_4 =$
$Na_2Ti(SO_4)_3 + 4NH_3 + 2H_2O$.

The ammonium double salt is similarly produced by using ammonium sulfate alone.

The alkaline earth double sulfates are produced by heating the material with an alkaline earth sulfate and ammonium sulfate.

If the raw material contains ferrous compounds, for instance if ilmenite is used as the raw material ferric sulfate and alkali sulfate are formed:

(6) $2FeO \cdot TiO_2 + 10(NH_4)_2SO_4 = Fe_2(SO_4)_3 + 2(NH_4)_2Ti(SO_4)_3 + 14NH_3 + 7H_2O + (NH_4)_2SO_3$.

This sulfite formation is prevented by roasting the ilmenite before the sulfate treatment:

(7) $Fe_2O_3 + 2TiO_2 + 9(NH_4)_2SO_4 = Fe_2(SO_4)_3 + 2(NH_4)_2Ti(SO_4)_3 + 7H_2O + 14NH_3$.

or by the formation of alkali double sulfate:

(8) $Fe_2O_3 + 2TiO_2 + 7(NH_4)_2SO_4 + 2Na_2SO_4 = Fe_2(SO_4)_3 + 2NaTi(SO_4)_3 + 7H_2O + 14NH_3$.

The vaporization of titanium as a tetrafluoride compound by the addition of a metallic fluoride to the titanium double sulfate takes place at about the same temperature at which the double sulfate is formed, but a higher temperature may be used. When ferric sulfate is present the temperature should be kept below the dissociation temperature of this compound.

The titanium tetrafluoride vapors evolved are colorless and condense to a liquid, solidifying to a colorless mass. Unlike the silicon tetrafluoride it is soluble in water without precipitation of titanium hydroxide, but the hydroxide is precipitated by water and ammonia, ammonium fluoride being formed.

If this precipitation takes place in a dilute solution, a hydrate of colloidal appearance is formed. The density of the precipitate is increased by increased concentration. The density of the precipitate is also increased by increased concentration of a salt dissolved in the liquid. For instance, ammonium fluoride, dissolved in the ammoniacal liquid used in the precipitation may be used to increase the density of the precipitate. The titanium tetrafluoride vapors may be contacted with the ammoniacal liquid to precipitate the titania or the titanium tetrafluoride may first be liquefied or solidified and then treated. By mixing the ammoniacal vapors from the sulfate reaction with the titanium tetrafluoride vapors titanium diamminotetrafluoride is formed.

The operation of the present invention may be carried out in the manner illustrated by the accompanying flow-sheet for the method for recovering hydrated titanium oxide from rutile which follows:

Example 1

Rutile, previously calcined by red heat, for instance at a temperature of about 800° C., and pulverized is mixed with 2 molecular parts of ammonium sulfate and 1 molecular part of sodium sulfate for each molecular part of titanium oxide and heated in an exteriorly heated furnace for instance of rotating or of muffler type, the latter supplied with stirring arrangement. A temperature of about 300°–350° C. is maintained in the reaction mass during the reaction. The escaping ammonia and water vapors are collected to be utilized later in the operation. When the evolution of vapors has ceased, sodium fluoride is added in a proportion of 4 molecular parts to 1 part of titanium oxide, and the heating is continued, raising the temperature to about 350°–400° C. until the evolution of fluoride vapors has ceased. The temperature may exceed 400° C.

The furnace residue which consists substantially of sodium sulfate is used to regenerate the sodium fluoride and sodium and ammonium sulfates used in these reactions.

The titanium tetrafluoride vapors, together with the ammoniacal vapors first evolved are contacted with an aqueous ammoniacal solution of ammonium fluoride in a scrubber tower which may be of acid proof stone construction or preferably of a non-corrosive alloy, for instance the 18% chromium, 8% nickel stainless steel. The tower may be filled with the usual ceramic filling material or cooling pipes of stainless steel may be used to disperse and simultaneously cool the liquid.

To prevent a dissociation of the normal ammonium fluoride into bifluoride and ammonia a temperature below about 34° C. is maintained and preferably a temperature below room temperature in order to obtain a dense precipitate. A considerable excess of circulating liquid is used.

The material obtained from the scrubber, consisting of hydrated titanium oxide suspended in the ammonium fluoride solution, is filtered. The filter cake is carefully washed, dried, pulverized and calcined.

The filtrate is divided into two parts. One part containing approximately the same amount of fluorine as that used in the reaction to vaporize the titanium is used to regenerate the sodium fluoride and ammonium sulfate, while the rest is recirculated in the scrubber. Instead of filtering the total liquid from the scrubber, an aliquot part may be taken out and treated while the remainder is recirculated.

The ammonium fluoride solution withdrawn may be mixed with the sodium sulfate of the furnace residue. Sodium fluoride is precipitated while sodium and ammonium sulfates remain in solution and may be crystallized out by evaporation. By using this procedure a cyclic process is established, as the loss of chemicals is limited to a small mechanical loss during the operation. The reaction may be summarily expressed by the following equations:

(9) $TiO_2 + Na_2SO_4 + 2(NH_4)_2SO_4 + 4NaF = TiF_4 \cdot 2NH_3 + 2NH_3 + 2H_2O + 3Na_2SO_4$

(10) $TiF_4 \cdot 2NH_3 + 2NH_3 + 2H_2O = TiO_2 + 4NH_4F$.

(11) $4NH_4F + 3Na_2SO_4 = 4NaF + 2(NH_4)_2SO_4 + Na_2SO_4$.

Example 2

Ilmenite, previously roasted to convert ferrous oxide to ferric, and pulverized, is mixed with ammonium sulfate in a proportion of 3 molecular parts to 1 part of titanium oxide and 3 parts to 1 part of ferric oxide and heated as described in Example 1. After the material is converted into sulfate compounds and the evolution of ammonia has ceased, fluorspar is added in a molecular proportion of 3 parts of calcium fluoride to 1 part of titanium oxide. By keeping the temperature below the dissociation temperature of the ferric sulfate, the reaction will proceed as described in Example 1.

After the reactions are finished, the residue may be further heated to dissociate the ferric sulfate and regenerate sulfuric acid or the residue may be used for the production of copperas.

The fluoride vapors are treated as already described. The ammonium fluoride produced by the precipitation of titania may be used in the production of fluoride compounds such as for instance cryolite or sodium fluoride, or it may be used to regenerate calcium fluoride and ammonium sulfate to be reused in the operation. The reaction may be summarily expressed by the following equations:

(12) $Fe_2O_3 + 2TiO_2 + 9(NH_4)_2SO_4 + 6CaF_2 =$
$Fe_2(SO_4)_3 + 6CaSO_4 + 2TiF_4·2NH_3 + 4NH_4F + 7H_2O + 10NH_3$.

(13) $2TiF_4·2NH_3 + 4NH_4F + 7H_2O + 10NH_3 =$
$2TiO_2 + 12NH_4F + 3H_2O + 6NH_3$.

(14) $Fe_2(SO_4)_3 + 3H_2O = 3H_2SO_4 + Fe_2O_3$.

(15) $3H_2SO_4 + 6NH_3 = 3(NH_4)_2SO_4$.

(16) $12NH_4F + 3(NH_4)_2SO_4 + 6CaSO_4 =$
$6CaF_2 + 9(NH_4)_2SO_4$.

If silica is present in the raw material in a form that can be attacked by the fluoride, silicon will vaporize together with the titanium tetrafluoride compound. But the water liberated by the silicon fluoride production will cause the formation of oxyfluoride compounds of titanium. For this reason the silicon is preferably removed before the vaporization of the titanium is taking place. The vaporization of the silicon may be accomplished during the sulfate formation by the addition of fluor spar.

(17) $Fe_2O_3 + 2TiO_2 + SiO_2 + 9(NH_4)_2SO_4 + 2CaF_2 =$
$Fe_2(SO_4)_3 + 2CaTi(SO_4)_3 + 9H_2O + 16NH_3 + SiF_4·2NH_3$.

By treating a mixture of silicon tetrafluoride and titanium tetrafluoride compounds with an aqueous ammoniacal liquid as described, an intimate mixture of silica and titania is produced which adds values to the titania as a pigment due to increased "brushability" of the paint, and smoothness and adhesiveness of the paint film without materially reducing the opacity of the titania.

I have found it advisable to have a small amount of an ammonium salt present during the reaction between the double sulfate of titanium and the metallic fluoride. Such an ammonium salt apparently greatly accelerates the reaction and seems to act as a catalyst. It is usually desirable, therefore, to use a slight excess of ammonium sulfate in the sulfating reaction so that a small amount may remain to accelerate the final reaction with the fluoride. Ammonium fluoride may be used instead of the sulfate, it preferably being added with the metallic fluoride.

The invention has been described in connection with details in specific examples but this is not meant to limit the scope of the invention.

I claim:

1. The method of removing titanium from a material comprising titanium oxide which comprises heating said material with ammonium sulfate in the presence of a metal sulfate capable of forming a double sulfate with tetravalent titanium sulfate at a temperature high enough to react with said titanium oxide to form tetravalent titanium sulfate, and further heating the double sulfate thus formed with a metallic fluoride to volatilize the titanium as a tetrafluoride compound.

2. The method of removing titanium from a material comprising a titanium oxide compound which comprises heating said material with ammonium sulfate in the presence of a metal sulfate capable of forming a double sulfate with tetravalent titanium sulfate at a temperature high enough to react with said titanium oxide compound to form sulfates therewith, and further heating the mixture of sulfates thus formed with a metallic fluoride to volatilize the titanium as a volatile tetrafluoride compound.

3. The process of claim 1 in which the metal sulfate capable of forming a double sulfate with tetravalent titanium sulfate is ammonium sulfate.

4. The process of claim 1 in which the metal sulfate capable of forming a double sulfate with tetravalent titanium sulfate is sodium sulfate.

5. The process of claim 1 in which the metallic fluoride is sodium fluoride.

6. The process of claim 1 in which the metallic fluoride is calcium fluoride.

7. The method of removing titanium from ilmenite which comprises heating ilmenite with ammonium sulfate present in sufficient quantity and at such a temperature as to form a double sulfate with the titanium of said ilmenite, and in further heating said double sulfate with sodium fluoride to volatilize the titanium as a tetrafluoride compound.

8. The method of removing titanium from ilmenite which comprises roasting ilmenite to oxidize the iron content thereof, heating said roasted ilmenite with ammonium sulfate to convert the titanium content into a tetravalent titanium ammonium double sulfate and convert the iron content into ferric sulphate, and heating the mixture of sulfates with calcium fluoride to volatilze the titanium as a tetrafluoride compound.

9. The method of removing titanium from a material comprising titanium oxide which comprises heating said material at a temperature of 280° C. to 350° C. with ammonium sulfate in the presence of a metal sulfate capable of forming a double sulfate with tetravalent titanium sulfate, and heating the double sulfate thus formed at a temperature in excess of 280° C. but below the dissociation temperature of ferric sulfate to volatilize the titanium as a tetrafluoride compound.

10. In the herein described method of removing titanium from titanium bearing materials, the step which comprises heating said material with ammonium sulfate in the presence of a metal sulfate capable of forming a double sulfate with tetravalent titanium sulfate at a temperature high enough to cause them to react with the titanium content thereof to form a double sulfate therewith.

11. In the herein described method of removing titanium from titanium-bearing materials, the step which comprises heating said material with ammonium sulfate in the presence of a metal sulfate capable of forming a double sulfate with tetravalent titanium sulfate at a temperature high enough to cause them to react with the titanium content thereof to form a double sulfate therewith and yet below the fusion temperature of the mass.

12. In the herein described method of removing titanium from titanium-bearing materials, the step which comprises heating said material with ammonium sulfate in the presence of a metal sulfate capable of forming a double sulfate with tetravalent titanium sulfate at a temperature of from around 280° C. to around 350° C. to cause them to react with the titanium content thereof to form a double sulfate therewith.

13. In the herein described method of removing titanium from titanium-bearing materials, the step which comprises heating said material with ammonium sulfate in the presence of a metal sulfate capable of forming a double sulfate with tetravalent titanium sulfate at a starting temperature of from around 280° C. to around 350° C. to cause them to react with the titanium content thereof to form a double sulfate therewith and completing the reaction at a temperature of about 400° C.

14. The method of claim 1 in which the metallic fluoride is heated with the double sulfate in the presence of a small amount of ammonium salt to accelerate the reaction.

15. The method of claim 1 in which a slight excess of ammonium sulfate is used, such excess being for the purpose of accelerating the reaction of the double sulfate and the metallic fluoride.

16. The method of removing titanium from titanium-bearing materials which comprises heating said material with ammonium sulfate in the presence of a metal sulfate capable of forming a double sulfate with tetravalent titanium at a temperature high enough to cause them to react with the titanium content thereof to form a double sulfate therewith and further heating the double sulfate thus formed with a metallic fluoride to volatilize the titanium as tetrafluoride, cooling the tetrafluoride vapors and decomposing them in an aqueous ammoniacal solution of ammonium fluoride to form hydrated titanium oxide.

17. The method of removing titanium from titanium-bearing materials which comprises heating said material with ammonium sulfate in the presence of a metal sulfate capable of forming a double sulfate with tetravalent titanium at a temperature of 280° C. to 350° C., and heating the double sulfate thus formed with a metallic fluoride at a temperature in excess of 280° C. but below the dissociation temperature of ferric sulfate to volatilize the titanium as tetrafluoride, and contacting the tetrafluoride vapors with an aqueous ammoniacal solution of ammonium fluoride at a temperature below about 34° C. and preferably below 20° C. to form hydrated titanium oxide.

18. The cyclic process for removing titanium from a material comprising titanium oxide which comprises heating said material with ammonium sulfate and sodium sulfate at a temperature sufficient to form titanic sodium sulfate, heating the double sulfate with sodium fluoride to form and volatilize titanium tetrafluoride therefrom, decomposing said titanium tetrafluoride with water in the presence of ammonia derived from the initial decomposition reaction to form titanium hydroxide and ammonium fluoride, reacting the ammonium fluoride with the sodium sulfate of the furnace residue to form sodium fluoride and ammonium sulfate for reuse with recovered sodium sulfate in said process with new portions of titanium bearing material.

19. The cyclic process for removing titanium from ilmenite which comprises roasting ilmenite to oxidize the iron content thereof, heating said roasted ilmenite with ammonium sulfate and sodium sulfate at a temperature of 280° C. to 350° C. to form titanic sodium sulfate and ferric sulfate, heating the mixture of sulfates with sodium fluoride at above 280° C. but below the decomposition temperature of ferric sulfate to form and volatilize titanium tetrafluoride therefrom, decomposing said titanium tetrafluoride with water in the presence of ammonia derived from the first decomposition reaction to form titanium hydroxide and ammonium fluoride, heating the furnace residue to decompose the ferric sulfate and produce iron oxide and sulfuric acid, neutralizing the sulfuric acid so formed with ammonia produced in the initial decomposition reaction, reacting said ammonium fluoride with the sodium sulfate in the furnace residue to form sodium fluoride and ammonium sulfate for reuse with recovered sodium sulfate in said process with new portions of roasted ilmenite.

20. The method of removing titanium from a material comprising titanium oxide which comprises heating said material with ammonium sulfate in the presence of an alkali metal sulfate at a temperature high enough to react with said titanium oxide to form a double sulfate with tetravalent titanium sulfate, and further heating the double sulfate thus formed with a metallic fluoride to volatilize the titanium as a tetrafluoride compound.

21. The method of removing titanium from a material comprising titanium oxide which comprises heating said material at a temperature of 280° C. to 350° C. with ammonium sulfate in the presence of an alkali metal sulfate, thereby forming a double sulfate with tetravalent titanium sulfate, and heating the double sulfate as formed with a metallic fluoride at a temperature in excess of 280° C. to volatilize the titanium as a tetrafluoride compound.

22. The method of claim 21 in which an excess of ammonium sulfate is used, such excess accelerating the reaction of the double sulfate and the metallic fluoride.

SVEND S. SVENDSEN.

Certificate of Correction

Patent No. 1,995,334. March 26, 1935.

SVEND S. SVENDSEN

It is hereby certified that errors appear in the printed specification of the above numbered patent requiring correction as follows: Page 1, first column, line 22, equation (2), for the first term before the equal sign "$TiOF_2.NH_2$," read $3TiOF_2.NH_3$; and line 23, for "evaporization" read *vaporization*; and that the said Letters Patent should be read with these corrections therein that the same may conform to the record of the case in the Patent Office.

Signed and sealed this 30th day of April, A. D. 1935.

[SEAL]

LESLIE FRAZER,
*Acting Commissioner of Patents.*